United States Patent
Mitarai

(10) Patent No.: US 9,715,080 B2
(45) Date of Patent: Jul. 25, 2017

(54) LENS DEVICE

(71) Applicant: FUJIFILM Corporation, Tokyo (JP)

(72) Inventor: Tsuyoshi Mitarai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/430,934

(22) Filed: Feb. 13, 2017

(65) Prior Publication Data

US 2017/0153411 A1 Jun. 1, 2017

Related U.S. Application Data

(63) Continuation of application No. PCT/JP2015/062722, filed on Apr. 27, 2015.

(30) Foreign Application Priority Data

Sep. 30, 2014 (JP) ................................. 2014-199922

(51) Int. Cl.
G02B 7/04 (2006.01)
(52) U.S. Cl.
CPC ..................................... G02B 7/04 (2013.01)
(58) Field of Classification Search
CPC . G02B 7/04; G02B 7/20; G02B 15/02; G02B 15/10
See application file for complete search history.

(56) References Cited

U.S. PATENT DOCUMENTS

| 2008/0158692 | A1 | 7/2008 | Tomita et al. |
| 2009/0251810 | A1 | 10/2009 | Hara |
| 2015/0138437 | A1 | 5/2015 | Matsuura et al. |

FOREIGN PATENT DOCUMENTS

| JP | 59-165039 | * | 9/1984 | ............. G03B 17/12 |
| JP | S59-165039 | A | 9/1984 | |
| JP | S61-116335 | A | 6/1986 | |
| JP | H04-140604 | A | 5/1992 | |
| JP | H10-35014 | A | 2/1998 | |
| JP | 2000-101908 | A | 4/2000 | |
| JP | 2004-354590 | A | 12/2004 | |
| JP | 2008-249845 | A | 10/2008 | |

(Continued)

OTHER PUBLICATIONS

International Search Report issued in PCT/JP2015/062722; mailed Aug. 4, 2015.

(Continued)

Primary Examiner — Joseph P Martinez
(74) Attorney, Agent, or Firm — Studebaker & Brackett PC

(57) ABSTRACT

A lens device includes a Hall IC detecting whether extender lenses are positioned on an optical axis or are retreated from the optical axis by rotating the extender lenses about a rotating shaft by a predetermined angle. An inner space of a lens barrel is divided into first to fourth spaces by a first plane passing through the rotating shaft and the optical axis and a second plane passing through the optical axis and perpendicular to the first plane. When the extender lenses are positioned on the optical axis, a magnet is fixed to a portion in the first space of an extender lens frame and the Hall IC is disposed in the first space on a side substantially opposite to a portion in which the rotating shaft is present, so that the Hall IC is not an obstacle even while the extender lenses rotate.

9 Claims, 7 Drawing Sheets

(56) References Cited

FOREIGN PATENT DOCUMENTS

| JP | 2008-281955 A | 11/2008 |
| JP | 2009-128554 A | 6/2009 |
| JP | 2009-145706 A | 7/2009 |
| JP | 2009-251189 A | 10/2009 |
| JP | 2011-053322 A | 3/2011 |
| JP | 2011-107270 A | 6/2011 |
| JP | 4886503 B2 | 2/2012 |
| JP | WO2014/034603 A1 | 3/2014 |

OTHER PUBLICATIONS

International Preliminary Report on Patentability issued in PCT/JP2015/062722; issued Mar. 1, 2016.

\* cited by examiner

LENS DEVICE

CROSS-REFERENCE TO RELATED APPLICATIONS

This application is a Continuation of PCT International Application No. PCT/JP2015/062722 filed on Apr. 27, 2015, which claims priority under 35 U.S.C. §119(a) to Japanese Patent Application No. 2014-199922 filed Sep. 30, 2014. Each of the above application(s) is hereby expressly incorporated by reference, in its entirety, into the present application.

BACKGROUND OF THE INVENTION

1. Field of the Invention

The present invention relates to a lens device.

2. Description of the Related Art

In a case in which a reference position is detected using a photo-interrupter, the photo-interrupter is disposed in a quadrant (A) in a zoom lens barrel, and a focus motor and a zoom motor, which drive a focus lens, a zoom lens, and the like, are disposed in quadrants (C) and (D) (JP4886503B). Further, an external drive unit is mounted on the outer peripheral surface of a lens barrel in a lens device in which a motor is not built (JP2011-107270A).

SUMMARY OF THE INVENTION

However, in the lens barrel disclosed in JP4886503B, the center of a lens, which is built in the lens barrel, is always positioned on the optical axis of the lens barrel and is not retreated from the optical axis. The photo-interrupter is to detect the reference position of the lens in the direction of the optical axis. In JP4886503B, the detection of whether the movable lens is positioned on the optical axis or is retreated from the optical axis is not considered in regard to a movable lens that can be positioned on the optical axis and can be retreated from the optical axis. The quadrants (A) to (D) have been originally defined in JP4886503B, but it is not understood that which quadrant of the quadrants (A) to (D) is positioned at which position in any direction during the use of the lens barrel since the lens barrel has a cylindrical shape. Further, the external drive unit of the lens barrel is merely disclosed in JP2011-107270A.

In a case in which whether a movable lens, which can be positioned on the optical axis and can be retreated from the optical axis, is positioned on the optical axis or is retreated from the optical axis is detected using a sensor and a detection result is output to the outside of the lens barrel, the position of the sensor is a problem. However, the position of the sensor detecting the position of the movable lens, which can be positioned on the optical axis and can be retreated from the optical axis, is not considered at all in both JP4886503B and JP2011-107270A.

An object of the invention is to provide a lens device in which a sensor detecting whether a movable lens, which can be positioned on an optical axis and can be retreated from the optical axis, is positioned on the optical axis or is retreated from the optical axis is disposed at an appropriate position.

The invention provides a lens device comprising a first movable lens held by a movable lens frame that is capable of being positioned on an optical axis of a lens barrel and retreated from the optical axis by rotating about a rotating shaft by a predetermined angle. In a case in which an inner space of the lens barrel (including the lens barrel and the wall of the lens barrel) is divided into four spaces (four portions) by a first plane passing through the rotating shaft and the optical axis and a second plane passing through the optical axis and perpendicular to the first plane and the four spaces are defined as a first space (a first portion), a second space (a second portion), a third space (a third portion) and a fourth space (a fourth portion) counterclockwise when seen toward a subject side from an image side, the rotating shaft is present between the third space and the fourth space. Further, in a case in which the first movable lens is positioned on the optical axis, a part to be detected is formed at a portion, which is present in the first space, of the movable lens frame. A detecting part, which outputs a signal representing that the first movable lens is positioned on the optical axis when detecting the part to be detected, is disposed in the first space. The first space, the second space, the third space, and the fourth space also include middle portions of walls of the lens barrel. In a case in which a region, which is positioned inside the outer peripheral surface of the lens barrel, is divided into four portions by the first plane and the second plane, these four portions are defined as a first space (a first portion, a first region), a second space (a second portion, a second region), a third space (a third space, a third region), and a fourth space (a fourth portion, a fourth region).

It is preferable that the detecting part is disposed in a closed storage space different from a space in which the movable lens frame is present.

The first movable lens and the detecting part are present on the same plane which a normal to is, for example, the optical axis.

It is preferable that a drive unit to which the signal output from the detecting part is input is mounted on the outer peripheral surface of the first and fourth spaces.

The lens device may further comprise a second movable lens moving in a direction of the optical axis. In this case, it is preferable that a drive device, which moves the second movable lens in the direction of the optical axis, is disposed in the third space or the fourth space.

It is preferable that the drive device is disposed in a closed storage space different from a space in which the first movable lens is present.

A drive unit, which drives the drive device, is mounted on the outer peripheral surface of, for example, the first and fourth spaces.

A position detection sensor, which detects a position of the second movable lens in the direction of the optical axis and outputs a signal representing the position, is disposed in the first space or the second space.

It is preferable that the position detection sensor is disposed in a closed storage space different from a space in which the first movable lens is present.

A drive unit, to which the signal output from the position detection sensor is input and which drives the drive device on the basis of the input signal, may be mounted on the outer peripheral surface of the first and fourth spaces.

According to the invention, the first movable lens is positioned on an optical axis of the lens barrel and retreated from the optical axis by rotating about the rotating shaft, which is positioned in the third space, by a predetermined angle. In a case in which the first movable lens is positioned on the optical axis, a part to be detected is formed on a portion, which is present in the first space, of a first lens moving frame and a detecting part, which outputs a signal representing that the first movable lens is positioned on the optical axis, is disposed in the first space. When the first movable lens is positioned on the optical axis, the detecting part detects the part to be detected and outputs a signal representing that the first movable lens is positioned on the optical axis. Since the rotating shaft of the first movable lens is present between the third space and the fourth space and the detecting part is present in the first space that is present on the side of the optical axis substantially opposite to the rotating shaft, the detecting part is hardly an obstacle in a case in which the first movable lens rotates about the rotating shaft.

DESCRIPTION OF THE PREFERRED EMBODIMENTS

Figure 1:
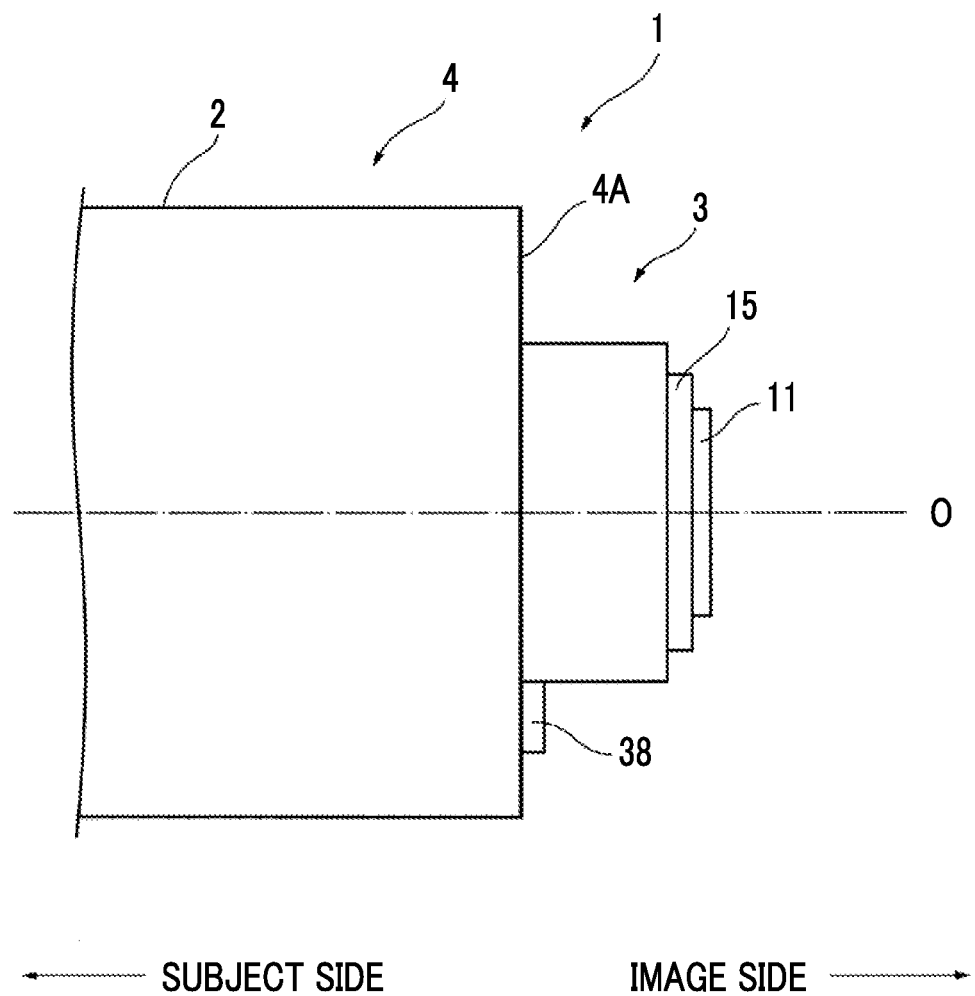
FIG. 1 is a side view of a part of a lens device.

FIG. 1 shows an embodiment of the invention and is a side view of an image-side (a side to be mounted on a television, a camera, or the like) end portion of a lens device 1.

A rear master lens portion 3, which protrudes toward an image side from a lens barrel body 4 of a lens barrel 2, is included in the image-side end portion of the lens device 1. The rear master lens portion 3 includes a rear master lens frame 11 that holds a rear master lenses 12 (see FIG. 2) so as to allow the rear master lenses 12 to be movable in the direction of an optical axis O. A rotating ring 15, which rotates about an optical axis O, is provided on the image side of the rear master lens frame 11. A switching lever 38 is mounted on an end face 4A of the lens barrel body 4, on which the rear master lens portion 3 is formed, below the rear master lens portion 3. The switching lever 38 is operated by a user when the user positions extender lenses 32 (see FIG. 7), which are included in the lens barrel body 4, on an optical axis O or retreats the extender lenses 32 from the optical axis O as described below. The extender lenses 32 rotate about a rotating shaft 34 (see FIG. 7). The rotating shaft 34 is fixed to the switching lever 38. For this reason, when the switching lever 38 is moved about the rotating shaft 34 by a predetermined angle (an angle allowing the extender lenses 32 to retreat from the optical axis O so that luminous flux passing through the lens barrel 2 does not pass through the extender lenses 32; in this embodiment, an angle in the range of, for example, about 50° to 60° or more in a counterclockwise direction), the extender lenses 32 (an extender lens frame 31) rotate about the rotating shaft 34 by a predetermined angle and is positioned on the optical axis O and is retreated from the optical axis O.

Figure 2:
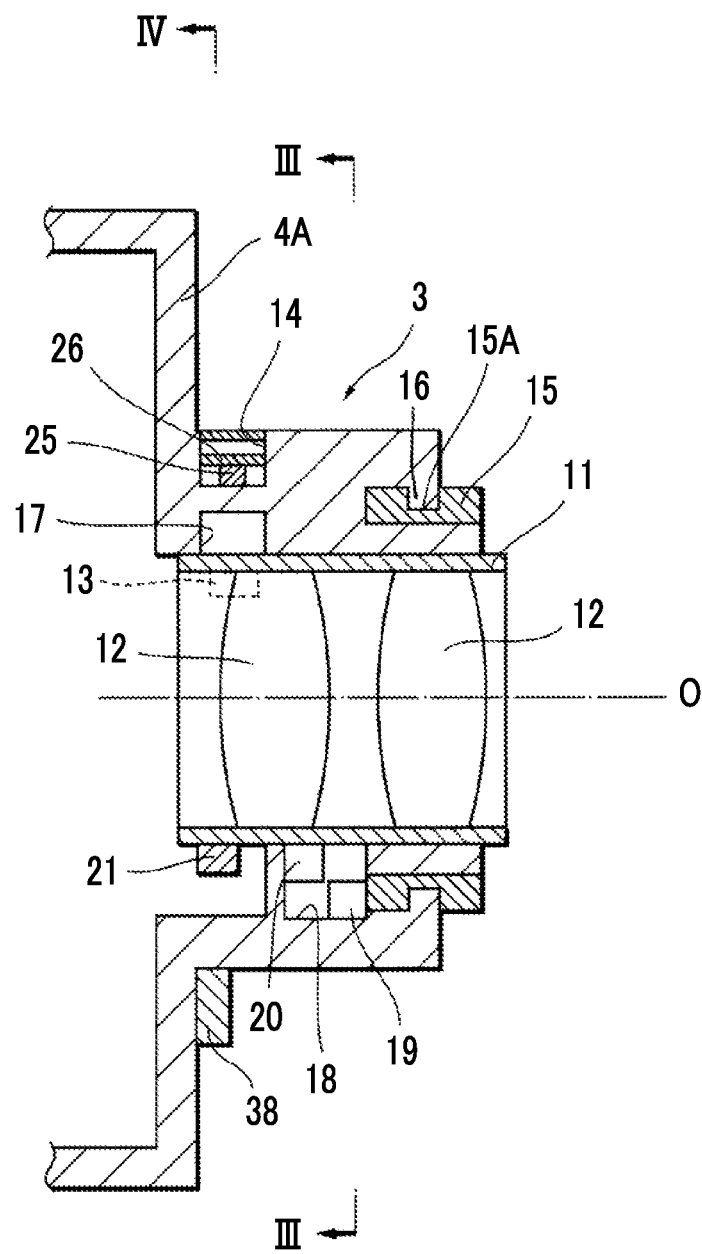
FIG. 2 is a longitudinal cross-sectional view of a rear master lens portion.
Figure 3:
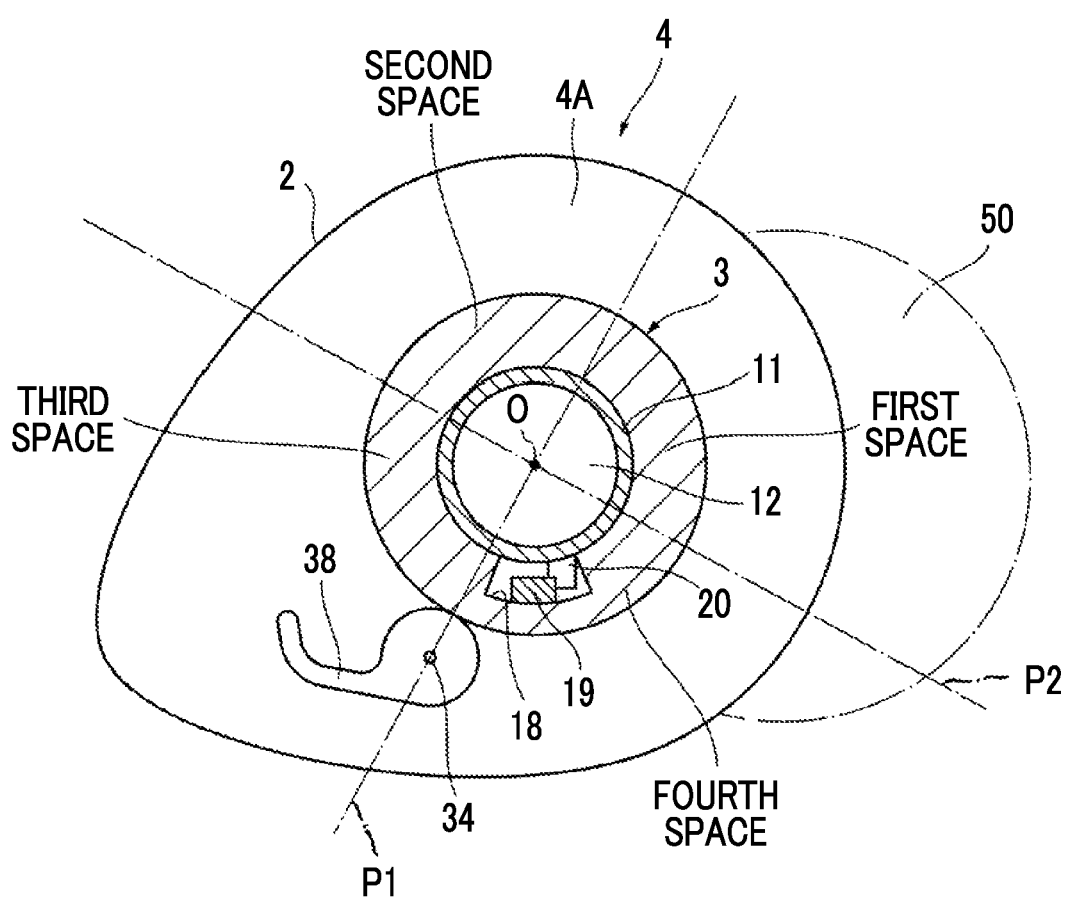
FIG. 3 is a cross-sectional view taken along line III-III of FIG. 2.

FIG. 2 is a longitudinal cross-sectional view of the rear master lens portion 3. FIG. 3 is a cross-sectional view taken along line III-III of FIG. 2.

Mainly referring to FIG. 2, the rear master lens portion 3 has a cylindrical shape. In the cylindrical rear master lens portion 3, rear master lenses 12 (a second movable lens), which move in the direction of the optical axis O, are held by the rear master lens frame 11. An engagement protrusion 16, which protrudes inward, is formed in an image-side portion of the rear master lens portion 3 over the circumferential direction. An engagement recess 15A, which is recessed inward, is formed on the outer peripheral surface of the rotating ring 15. The engagement recess 15A is fitted to the engagement protrusion 16, so that the rear master lens portion 3 and the rotating ring 15 are engaged with each other and the rotating ring 15 rotates about the optical axis O.

A closed storage space 18 is formed in the substantially middle portion of a lower portion of the end portion of the rear master lens portion 3. A rotation angle detection sensor 19 that detects the rotation angle (the rotation amount, a rotational position) of the rotating ring 15 and a drive motor (a drive device) 20 that moves the rear master lens frame 11 in the direction of the optical axis are stored in the storage space 18. The rotation angle detection sensor 19 and the drive motor 20 are disposed in the closed storage space 18 that is different from a space in which the extender lenses 32 are present. The rotation angle detection sensor 19 and the drive motor 20 do not necessarily need to be disposed in the same storage space 18. A shaft of the drive motor 20 protrudes from the storage space 18 into a space of the lens barrel body 4 in which the extender lenses 32 are stored. A gear 21 is fitted to the shaft. The gear 21 meshes with a rack (not shown) that is formed in the direction of the optical axis O on the outer peripheral surface of the rear master lens frame 11. When the shaft of the drive motor 20 is rotated, the rear master lens frame 11 is moved in the direction of the optical axis O.

A closed storage space 14 is formed at an upper portion of the end portion of the rear master lens portion 3. A Hall IC (a position detection sensor) 25 is disposed in the storage space 14. A substrate 26, which is electrically connected to the Hall IC 25, is also stored in the storage space 14. A magnet (a part to be detected) 13 is fixed to the inner peripheral surface of an end portion of the rear master lens frame 11 at a position facing the Hall IC 25 in a radial direction. The position of the magnet 13 in the direction of the optical axis O is detected by the Hall IC 25, and a signal representing the position of the magnet 13 is output to the substrate 26 from the Hall IC 25.

Referring to FIG. 3, in this embodiment, the inner space of the lens barrel 2 is divided into four spaces by a first plane P1 that passes through the rotating shaft 34 of the switching lever 38 and the optical axis O and a second plane P2 that passes through the optical axis O and is perpendicular to the first plane. The four spaces are defined as a first space, a second space, a third space, and a fourth space counterclockwise when seen toward the subject side from the image side. The rotating shaft 34 is present between the third space and the fourth space.

Since the storage space 18, which stores the rotation angle detection sensor 19 and the drive motor 20, is present in the fourth space as described above, the rotation angle detection sensor 19 and the drive motor 20 are also present in the fourth space. In a case in which a microphone (not shown) is used, the microphone is usually positioned on the upper side in FIG. 3. Since the drive motor 20 is disposed in the fourth space in this embodiment, the drive motor 20 is distant from the position of the microphone. Accordingly, the pick-up of the sound of the drive motor 20, which is performed by the microphone, is prevented. Further, since a distance between the drive motor 20 and a drive unit 50 is also relatively short, a line electrically connecting the drive motor 20 to the drive unit 50 is also short. For this reason, the line is also not an obstacle in the lens barrel 2. Since the third space is also relatively distant from the position of the microphone most of all, the drive motor 20 may be disposed in the third space.

Further, in this embodiment, the drive unit 50 is mounted on the outer peripheral surface of the lens barrel body 4 (the lens barrel 2) between the first and second spaces. A signal, which represents the rotation angle of the rotating ring 15 and is output from the rotation angle detection sensor 19, is input to the drive unit 50, and the drive unit 50 outputs a signal, which drives the drive motor 20 on the basis of the input signal, to the drive motor 20. Further, the signal, which represents the position of the rear master lenses 12 in the direction of the optical axis O and is output from the Hall IC 25, is input to the drive unit 50, and the rear master lenses 12 is positioned at a position in the direction of the optical axis O that is instructed by the rotating ring 15.

Figure 4:
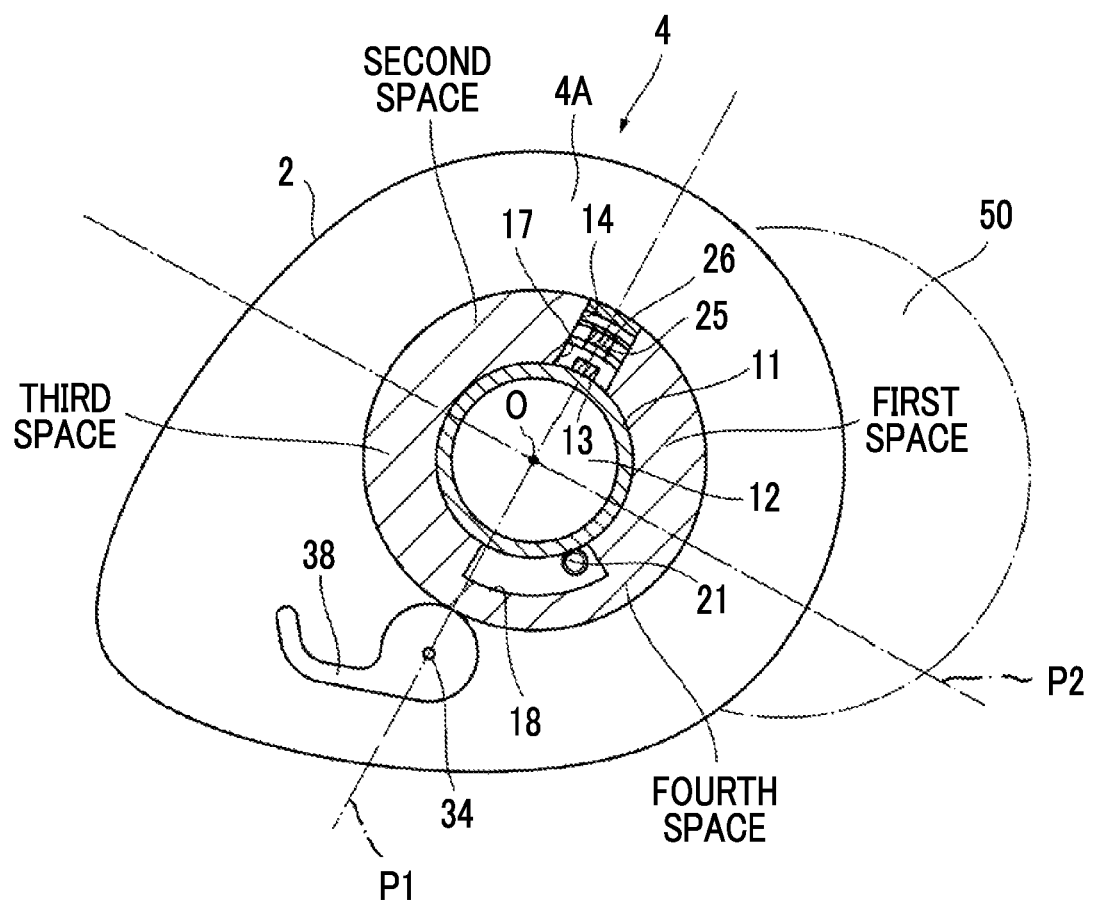
FIG. 4 is a cross-sectional view taken along line IV-IV of FIG. 2.

FIG. 4 is a cross-sectional view taken along line IV-IV of FIG. 2.

The above-mentioned storage space 14 is formed in the closed first space that is different from a space in which the extender lenses 32 are present. For this reason, the Hall IC (the position detection sensor) 25, which is disposed in the storage space 14, is also present in the first space. The signal, which represents the position of the rear master lenses 12 (the rear master lens frame 11) in the direction of the optical axis O and is output from the Hall IC 25, is sent to the drive unit 50 that is mounted on the outer peripheral surface of the first space in which the Hall IC 25 is present. Since a distance between the Hall IC 25 and the drive unit 50 is short, a signal line, which is used to send the signal output from the Hall IC 25 to the drive unit 50, is also not an obstacle in the lens barrel 2. Most of all, the magnet 13 and the Hall IC 25 may be disposed in the second space.

Figure 5:
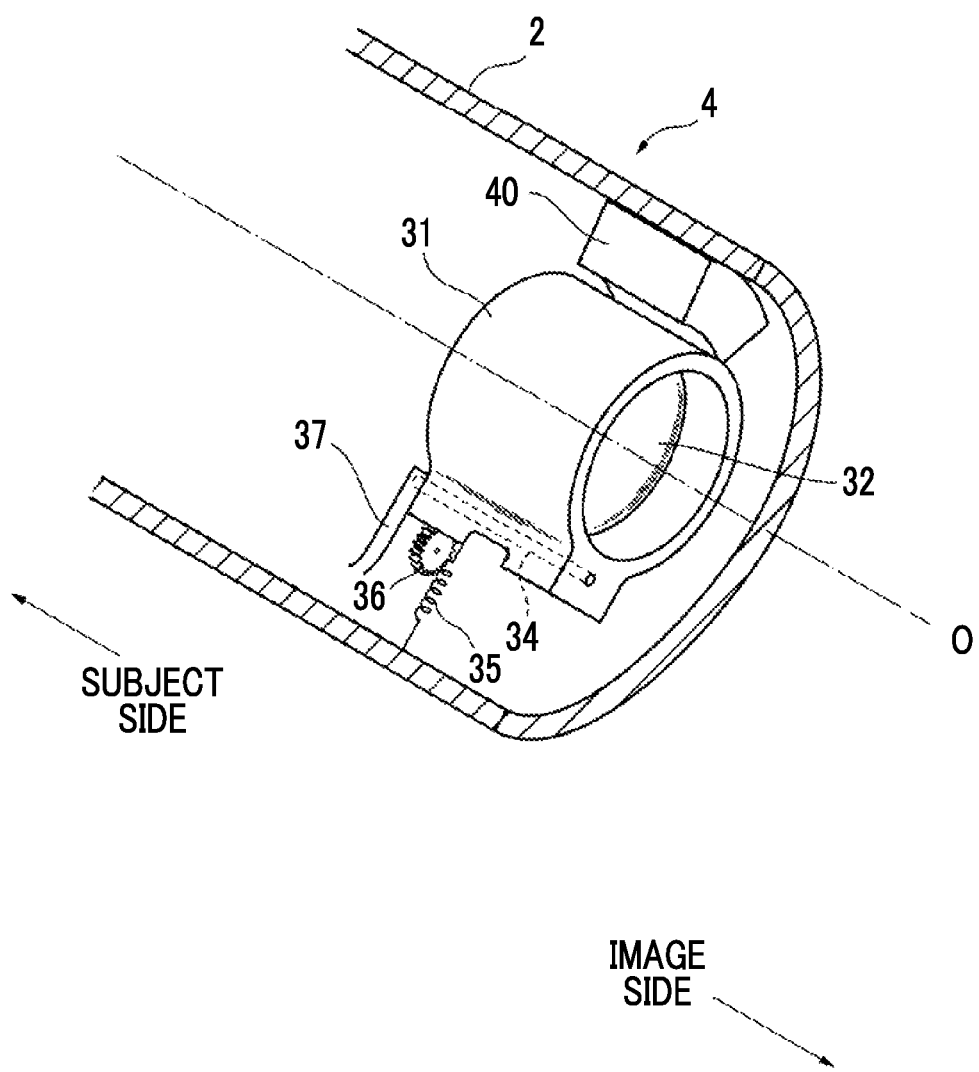
FIG. 5 is a perspective view of the lens device of which a part of a lens barrel body is cut out.
Figure 6:
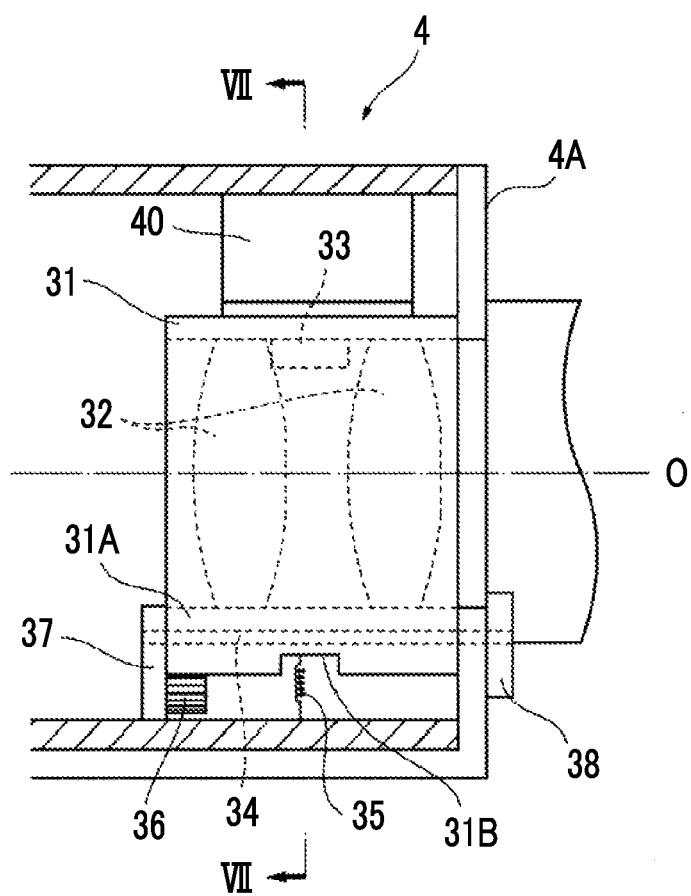
FIG. 6 is a side view of FIG. 5.

FIG. 5 is a perspective view showing a state in which a part of the outer periphery of the lens barrel body 4 is cut out and the inside of the lens barrel body 4 is seen. FIG. 6 is a side view of FIG. 5, and FIG. 7 is a cross-sectional view taken along line VII-VII of FIG. 6.

Figure 7:
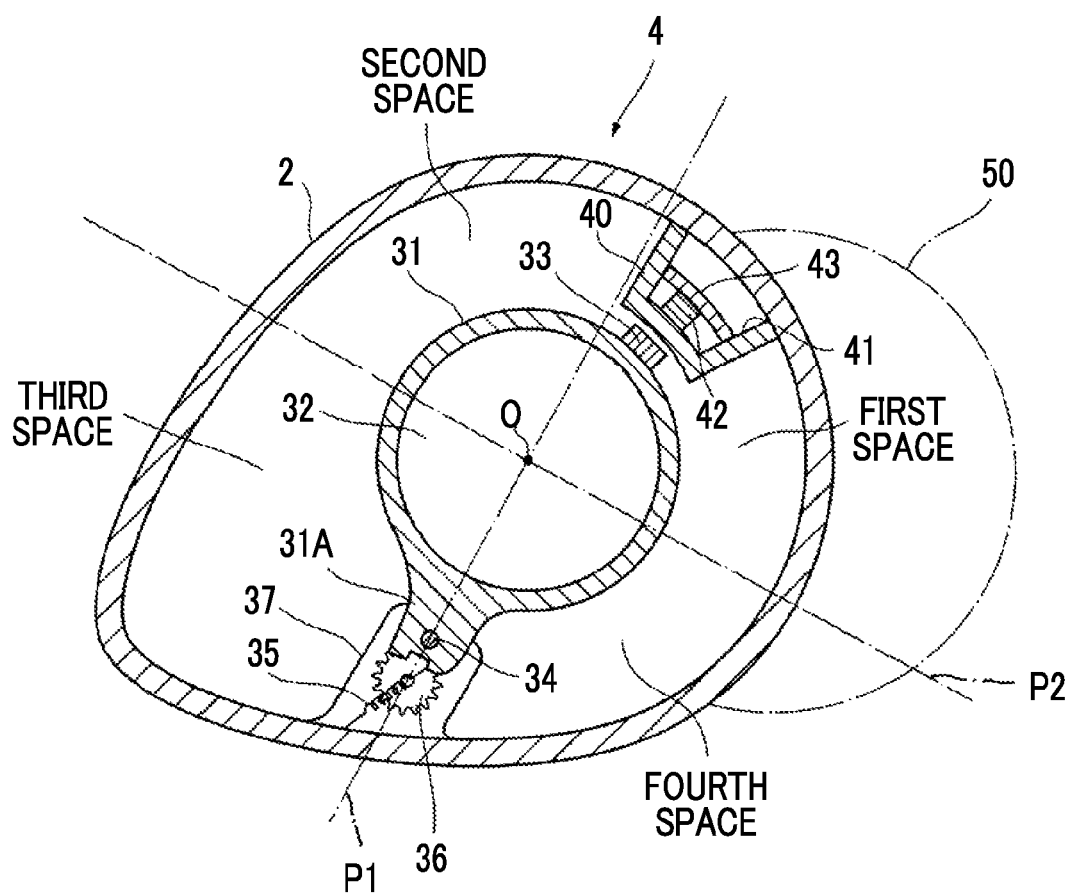
FIG. 7 is a cross-sectional view taken along line VII-VII of FIG. 6.

Mainly referring to FIG. 7, the extender lenses 32 are held by the cylindrical extender lens frame 31. A holding portion 31A, which protrudes in the radial direction, is formed at the lower portion of the extender lens frame 31. As shown in FIG. 6, the rotating shaft 34 is fixed to the holding portion 31A and passes through the holding portion 31A in the direction of the optical axis O. A support member 37 is formed on the subject-side end face of the holding portion 31A, and the image-side end face of the holding portion 31A is in contact with the inner wall of the end face 4A of the lens barrel body 4. The rotating shaft 34 passes through the inside of the support member 37. The rotating shaft 34 also passes through the inside of the inner wall of the end face 4A, enters the switching lever 38 being in contact with the end face 4A, and is fixed to the switching lever 38. When the switching lever 38 is rotated about the rotating shaft 34 in the circumferential direction by a predetermined angle, the extender lens frame 31 fixed to the rotating shaft 34 rotates about the rotating shaft 34 by a predetermined angle. Accordingly, the extender lenses 32 are positioned on the optical axis O and are retreated from the optical axis O.

A recess 31B, which is recessed in the radial direction, is formed at the middle portion of the holding portion 31A of the extender lens frame 31 in the direction of the optical axis O. A tension spring 35 extends from the recess 31B, and the tension spring 35 is fixed to the inner wall of the lens barrel body 4. Tension is applied to the extender lens frame 31 by the tension spring 35 so that the extender lenses 32 are positioned on the optical axis O. A rotary damper 36 is mounted on the subject-side of the holding portion 31A. The extender lenses 32 are positioned on the optical axis O or are stopped at a position retreated from the optical axis O against the tension of the tension spring 35 by the rotary damper 36. The tension spring 35 and the rotary damper 36 form a mechanism that stops the extender lenses 32 in a state in which the extender lenses 32 are positioned on the optical axis O and a state in which the extender lenses 32 are retreated from the optical axis O. The mechanism is present in the third space that is present on the side of the optical axis O opposite to the first space in which a Hall IC 42 is present.

Mainly referring to FIG. 7, a magnet (a part to be detected) 33 forming a sensor, which detects whether the extender lenses 32 are positioned on the optical axis O or are retreated from the optical axis O, is fixed to (formed on) a portion, which is present in the first space, of the outer peripheral surface of the extender lens frame 31. Further, a closed storage box 40 is formed in a space, which is different from a space in which the extender lenses 32 are present, at a position facing the magnet 33 in the radial direction. A Hall IC (a detecting part) 42 and a substrate 43 are disposed in a storage space 41 of the storage box 40. The extender lens frame (the movable lens frame) 31 and the Hall IC (the detecting part) 42 are present on the same plane which a normal to is the optical axis O. When the extender lenses 32 are positioned on the optical axis O, the magnetic flux of the magnet 33 is detected by the Hall IC 42 and a signal representing that the extender lenses 32 are positioned on the optical axis O is output to the substrate 43. The signal is sent to the drive unit 50 from the substrate 43. Since the magnetic flux of the magnet 33 is not detected by the Hall IC 42 when the extender lenses 32 are retreated from the optical axis O, it is found that the extender lenses 32 are retreated from the optical axis O.

Since the drive unit 50 is mounted on the outer peripheral side of the first space, a line, which transmits a signal output from the Hall IC 42 (the substrate 43) to the drive unit 50, is not an obstacle in the lens barrel body 4.

In the above-mentioned embodiment, the drive motor 20 and the Hall ICs 25 and 42 are disposed in the closed space but do not necessarily need to be disposed in the closed space. Further, the drive unit 50 may be detachable or may not be detachable from the lens barrel body 4. In a case in which the drive unit 50 is detachable from the lens barrel body 4, a detachable electrical connector is formed on each of the lens barrel body 4 and the drive unit 50 so that the lens barrel body 4 and the drive unit 50 can be electrically connected to each other.

What is claimed is:

1. A lens device comprising:
   a first movable lens held by a movable lens frame that is capable of being positioned on an optical axis of a lens barrel and retreated from the optical axis by rotating about a rotating shaft by a predetermined angle,
   wherein in a case in which an inner space of the lens barrel is divided into four spaces by a first plane passing through the rotating shaft and the optical axis and a second plane passing through the optical axis and perpendicular to the first plane and the four spaces are defined as a first space, a second space, a third space, and a fourth space counterclockwise when seen toward a subject side from an image side, the rotating shaft is present between the third space and the fourth space,
   in a case in which the first movable lens is positioned on the optical axis, a part to be detected is formed at a portion, which is present in the first space, of the movable lens frame, and a detecting part, which outputs a signal representing that the first movable lens is positioned on the optical axis when detecting the part to be detected, is disposed in the first space wherein a removable drive unit to which the signal output from the detecting part is input is mounted on the outer peripheral surface of the first and fourth spaces.

2. The lens device according to claim 1, wherein the detecting part is disposed in a closed storage space that is different from a space in which the first movable lens is present.

3. The lens device according to claim 1, wherein the movable lens frame and the detecting part are present on the same plane which a normal to is the optical axis.

4. The lens device according to claim 1, further comprising:

a second movable lens that moves in a direction of the optical axis, wherein a drive device, which moves the second movable lens in the direction of the optical axis, is disposed in the third space or the fourth space.

5. The lens device according to claim 4, wherein the drive device is disposed in a closed storage space that is different from a space in which the first movable lens is present.

6. The lens device according to claim 4, wherein a drive unit, which drives the drive device, is mounted on the outer peripheral surface of the first and fourth spaces.

7. The lens device according to claim 4, wherein a position detection sensor, which detects a position of the second movable lens in the direction of the optical axis and outputs a signal representing the position, is disposed in the first space or the second space.

8. The lens device according to claim 7, wherein the position detection sensor is disposed in a closed storage space that is different from a space in which the first movable lens is present.

9. The lens device according to claim 7, wherein a drive unit, to which the signal output from the position detection sensor is input and which drives the drive device on the basis of the input signal, is mounted on the outer peripheral surface of the first and fourth spaces.

* * * * *